United States Patent
Son et al.

(10) Patent No.: US 8,346,816 B2
(45) Date of Patent: Jan. 1, 2013

(54) METHOD AND APPARATUS FOR PHYSICAL/LOGICAL RELATIONSHIP MAPPING BETWEEN RESOURCES

(75) Inventors: Ji-Yeon Son, Daejeon (KR); Young-Sung Son, Daejeon (KR); Hark-Jin Lee, Gumi (KR); Kyeong-Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 59 days.

(21) Appl. No.: 12/953,266

(22) Filed: Nov. 23, 2010

(65) Prior Publication Data

US 2011/0131252 A1    Jun. 2, 2011

(30) Foreign Application Priority Data

Nov. 27, 2009   (KR) .................. 10-2009-0115980

(51) Int. Cl.
 *G06F 7/00* (2006.01)
 *G06F 17/30* (2006.01)
(52) U.S. Cl. ........................ 707/803; 707/737
(58) Field of Classification Search .................. 707/803, 707/737
See application file for complete search history.

(56) References Cited

U.S. PATENT DOCUMENTS

| | | | |
|---|---|---|---|
| 5,734,887 A | 3/1998 | Kingberg et al. | |
| 5,937,409 A * | 8/1999 | Wetherbee | 1/1 |
| 6,990,601 B1 | 1/2006 | Tsuneya et al. | |
| 2004/0008881 A1* | 1/2004 | Akimov | 382/154 |
| 2004/0049509 A1 | 3/2004 | Keller et al. | |
| 2004/0085347 A1* | 5/2004 | Hagarty et al. | 333/735 |
| 2005/0140694 A1* | 6/2005 | Subramanian et al. | 345/619 |
| 2005/0172162 A1 | 8/2005 | Takahashi et al. | |
| 2006/0004845 A1* | 1/2006 | Kristiansen et al. | 707/103 R |
| 2008/0270851 A1 | 10/2008 | Ochi et al. | |
| 2009/0138887 A1 | 5/2009 | Uehara et al. | |
| 2009/0150542 A1 | 6/2009 | Yahiro et al. | |

FOREIGN PATENT DOCUMENTS

| | | |
|---|---|---|
| JP | 2001-125854 A | 5/2001 |
| JP | 2005-031795 A | 2/2005 |
| JP | 2005-346719 A | 12/2005 |
| JP | 2007-011823 A | 1/2007 |
| JP | 2008-276279 A | 11/2008 |
| JP | 2009-145962 A | 2/2009 |
| JP | 2009-151745 A | 7/2009 |
| JP | 2009-169863 A | 7/2009 |
| WO | WO 2004/061681 A1 | 7/2004 |

\* cited by examiner

*Primary Examiner* — Cam Truong (57) ABSTRACT

Disclosed is a method for dynamically mapping a physical/logical relationship between resources. The method for physical/logical relationship mapping between resources includes: abstracting heterogeneous environments of physical resources; expressing the physical resources by a resource instance of a predetermined format to generate logical resources which are grouped and managed in accordance with types of the resources; and analyzing the physical/logical relationship between the resources to generate a relation map.

16 Claims, 11 Drawing Sheets

METHOD AND APPARATUS FOR PHYSICAL/LOGICAL RELATIONSHIP MAPPING BETWEEN RESOURCES

CROSS REFERENCE TO RELATED APPLICATIONS

This application claims priority to Korean Patent Application No. 10-2009-0115980 filed on Nov. 27, 2009, the entire contents of which are herein incorporated by reference.

BACKGROUND OF THE INVENTION

1. Field of the Invention

The present invention relates to a method and an apparatus for physical/logical relationship mapping between resources, and more particularly, to a method and an apparatus for defining at least one of components such as a device, a network, a service, a user, contents, etc., which may serve as one management unit as a resource and dynamically mapping a physical resource model to a logical resource model.

2. Description of the Related Art

In recent years, with development of hardware and software technologies, various types of devices, networks, services, etc., have appeared. As a result, the number of resources that should be managed by people and computers has rapidly increased. In particular, there is a growing need to integrally manage resources in a domain, which are connected to a network per predetermined domain such as a home or a building.

Examples of known methods for the integrated management includes a method in which application programs having predetermined purposes such as security management, energy management, etc., directly access, monitor, and control individual resources or a method for accessing and controlling a logical resource corresponding to a physical resource.

However, the known methods do not provide a function to determine the relation between resources and has a limit in determining the relation between the resources in an application level. Therefore, the known methods are difficult to integrally and exquisitely manage resources. For example, when resources at a location where a predetermined resource is positioned needs to be controlled in batches, information on individual resources should be retrieved and found one by one in order to find the resources at the corresponding location. As another example, even when resources activated for a predetermined period need to be tracked, it is difficult to determine the resources.

U.S. Pat. No. 6,847,970 (U.S. patent application Ser. No. 10/241,162) discloses a technology for providing an abstraction of a predetermined level for individual systems and computing a service/component dependency relation (components may be, for example, applications, middleware, hardware, device drivers, operating systems, and systems relating to a computing environment) related to an end-to-end service recognized by a customer, as a technology for managing a run time dependency relation between various components of a computing system. However, in this technology, judgment of existence of one or more relations in the computing environment may describe an entire lifecycle related to at least one component of the computing environment, but an integrated resource management function is not provided, thus, management convenience is not provided to a user, and the resources are not consistently and exquisitely managed.

SUMMARY OF THE INVENTION

The present invention is contrived to solve the above-mentioned problems of the prior art. There is an object of the present invention to provide a method and an apparatus for mapping the relation between resources through dynamic generation of a relation map by defining at least one of components which may be one management unit as the resource, and monitoring and analyzing the physical/logical relationship between the resources in order to integrally and exquisitely manage the resource.

There is provided a method for defining at least one of components such as a device, a network, a service, a user, contents, etc., which may serve as one management unit and physical/logical relationship mapping dynamically between resources that includes: abstracting heterogeneous environments of physical resources; expressing the physical resources by a resource instance of a predetermined format to generate logical resources which are grouped and managed in accordance with types of the resources; and analyzing the physical/logical relationship between the resources and to generate a relation map for supporting an integrated resource management function.

In particular, logical resources are grouped and managed in accordance with types of the resources in managing the logical resources, the relation between the resources is analyzed on the basis of event data generated in managing the logical resources and data collected from the physical abstraction step, and a relation map between the resources is generated and stored.

Further, at the resource relation analysis, the physical/logical relationship between the resources is automatically sensed by analyzing information and events of the resources generated in the logical resource management and data collected from a physical abstraction layer.

In addition, at the generation of the relation map between the resources, the relation between the resources is generated in an expressible map or graph on the basis of the analysis result of the generated relation of the resources.

Moreover, the analyzing the physical/logical relationship performs a function to allocate and process the resources in accordance with a resource allocation request.

Besides, the physical/logical relationship between the resources includes at least one of a physical positional relation, a topology relation, and a time relation.

Further, the physical positional relation between the resources includes at least one of a relative positional relation including a relative distance and a relative angle and an absolute positional relation including an absolute coordinate or a logical position.

In addition, the topology relation between the resources includes at least one of an ID, a link type, a link name, link source node and sink node information, and a link state of a network link.

Moreover, the time relation between the resources includes at least one of an execution sequence, an absolute time, and a relative time by a time interval.

Besides, when an error occurs on the execution sequence of the resources, the relative time by the time interval is used to trace back the error.

Further, the relation analysis between the physical/logical resources includes: processing a request for registering resource information providable from a logical resource manager; periodically collecting registered collected resource information; analyzing the relation between the resource information by using newly collected resource information and information stored in a physical/logical resource relation map; and transferring the analyzed and drawn relation between the resource information as an input value in generating the resource relation map.

In addition, the processing a request for registering providable resource information includes: when the request for registering the resource information providable by a logical resource manager itself is received from the logical resource manager in the logical resource management, adding the corresponding resource information to a collected resource list; checking a type of the newly added collected resource information; if the type of the collected resource information is a static type in which the information is not periodically changed, directly bringing the collected resource information from a designated storage; and if the type of the collected resource information is a dynamic type in which the information is periodically or aperiodically changed, setting a timer value for periodically colleting the resource information and registering a timer.

Moreover, the generating the relation map between the resources includes: checking whether or not the resource relation map exists in a physical/logical resource relation map storage; generating a new resource relation map by using a newly inputted resource relation information and storing the generated map in the storage when the resource relation map does not exist; bringing the resource relation map from the storage and reflecting new resource relation information on the current resource relation map when the resource relation map has already existed in the storage; and storing the newly modified resource relation map in the storage again.

There is provided an apparatus for defining at least one of components such as a device, a network, a service, a user, contents, etc., which may serve as one management unit as a resource and dynamically mapping a physical resource model to a logical resource model that includes: in order to dynamically map a physical/logical relationship between resources, a physical abstraction layer abstracting heterogeneous environments of physical resources; and an integrated physical/logical resource managing layer of expressing the physical resources by a resource instance of a predetermined format, and grouping and managing the physical resources in accordance with types of the resources and analyzing the physical/logical relationship between the resources and generating a relation map to support an integrated resource management function.

In particular, the integrated physical/logical resource managing layer includes: a logical resource manager grouping and managing logical resources in accordance with types of the resources in managing the logical resources; and an integrated physical/logical resource manager analyzing the relation between the resources on the basis of event data generated in managing the logical resources and data collected from the physical abstraction step, and generating a relation map between the resources.

Further, the integrated physical/logical resource manager includes: a physical/logical resource relation analyzer automatically sensing the physical/logical relationship between the resources by analyzing information and events of the resources generated from the logical resource manager and data collected from the physical abstraction layer; a resource relation map generator generating the relation between the resources in a map, a graph, or various other forms that are expressible on the basis of the analysis result of the relation between resources inputted from the physical/logical resource relation analyzer; a resource relation map storage storing the physical/logical relation map between the resources generated from the resource relation map generator; and a resource allocator allocating and processing the resources in accordance with a resource allocation request.

In addition, the physical/logical relationship between the resources includes at least one of a physical positional relation, a topology relation, and a time relation.

Moreover, the physical positional relation between the resources includes at least one of a relative positional relation including a relative distance and a relative angle and an absolute positional relation including an absolute coordinate or a logical position.

Besides, the topology relation between the resources includes at least one of an ID, a link name, a link type, link source node and sink node information, and a link state of a network link.

Further, the time relation between the resources includes at least one of an execution sequence, an absolute time, and a relative time by a time interval.

According to an embodiment of the present invention, it is possible to provide management convenience to a user and consistently and exquisitely manage resources by integrally managing resources through dynamically analyzing and mapping the relation between the resources.

DETAILED DESCRIPTION OF THE PREFERRED EMBODIMENTS

Hereinafter, the present invention will be described in detail with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of elements in the figures may be exaggerated for explicit comprehension.

Hereinafter, preferred embodiments of the present invention will be described in detail with reference to the accompanying drawings.

Figure 1:
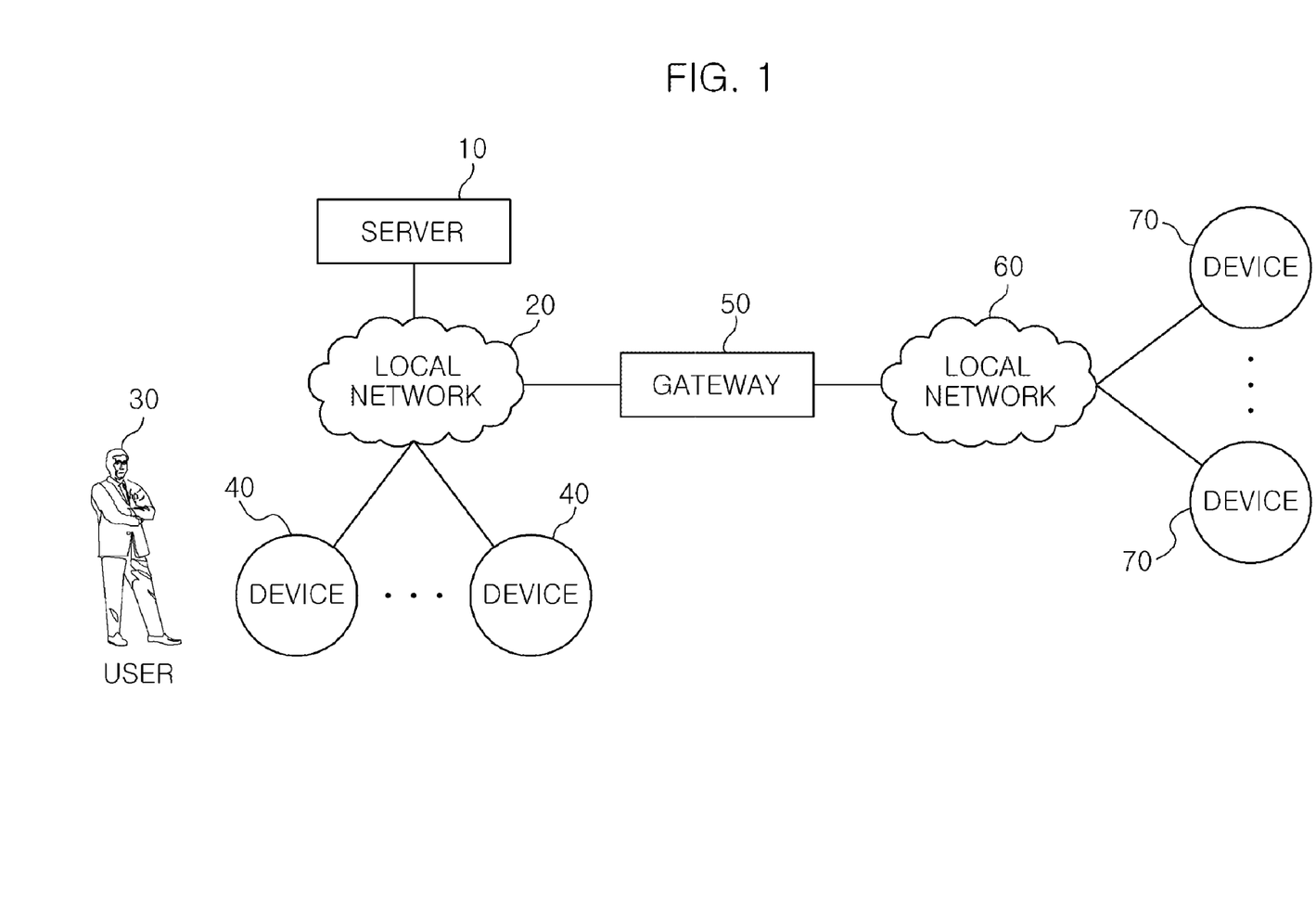
FIG. 1 is a diagram showing a configuration of a system adopting the present invention.

FIG. 1 is a diagram showing a configuration of a system adopting the present invention.

Referring to this figure, in the case of a connection configuration between resources, resources including devices (40, . . . , 40) (70, . . . , 70) are connected to one or more local networks 20 and 60 and a user may also be included as one resource.

In the case of a user 30, information including existence or not, an ID, an action, a priority, a position, a behavior pattern, etc., of the user may be management targets.

An apparatus for physical/logical relationship mapping between resources according to an embodiment of the present invention may operate while being mounted on a server 10 or a gateway 50 or connected with an additional apparatus.

One or more local networks 20 may be connected with other local network(s) 60 by the gateway 50. The local networks 20 and 60 may adopt all wire/wireless networks utilizable as a local/short-range network such as Ethernet, a wireless LAN, Zigbee, IS-485, power line communication (PLC), Bluetooth, etc.

Figure 2:
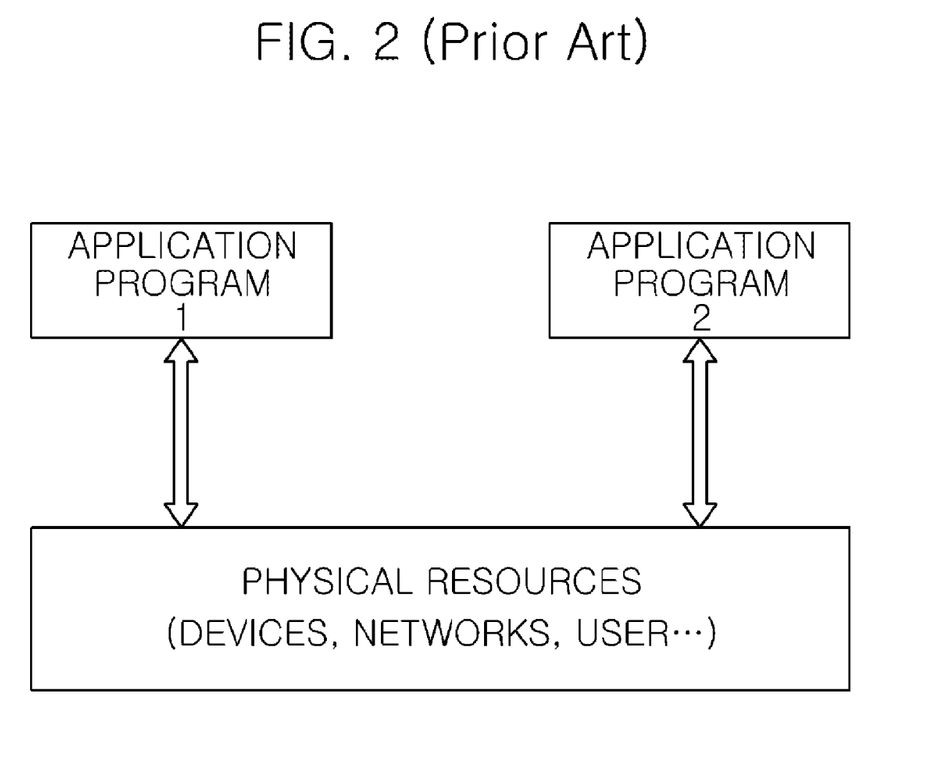
FIG. 2 is a diagram for describing a resource management method according to a known method.

FIG. 2 is a diagram for describing a resource management method according to a known method.

Referring to this figure, in the case of the resource management method according to the known method, physical resources required for application programs (application program 1 and application program 2) to perform predetermined functions are mapped to a logical resource by a format defined themselves to be managed. However, the known method is difficult to perform an integrated and exquisite resource management function because it does not consider the physical and logical relations between the resources.

Figure 3:
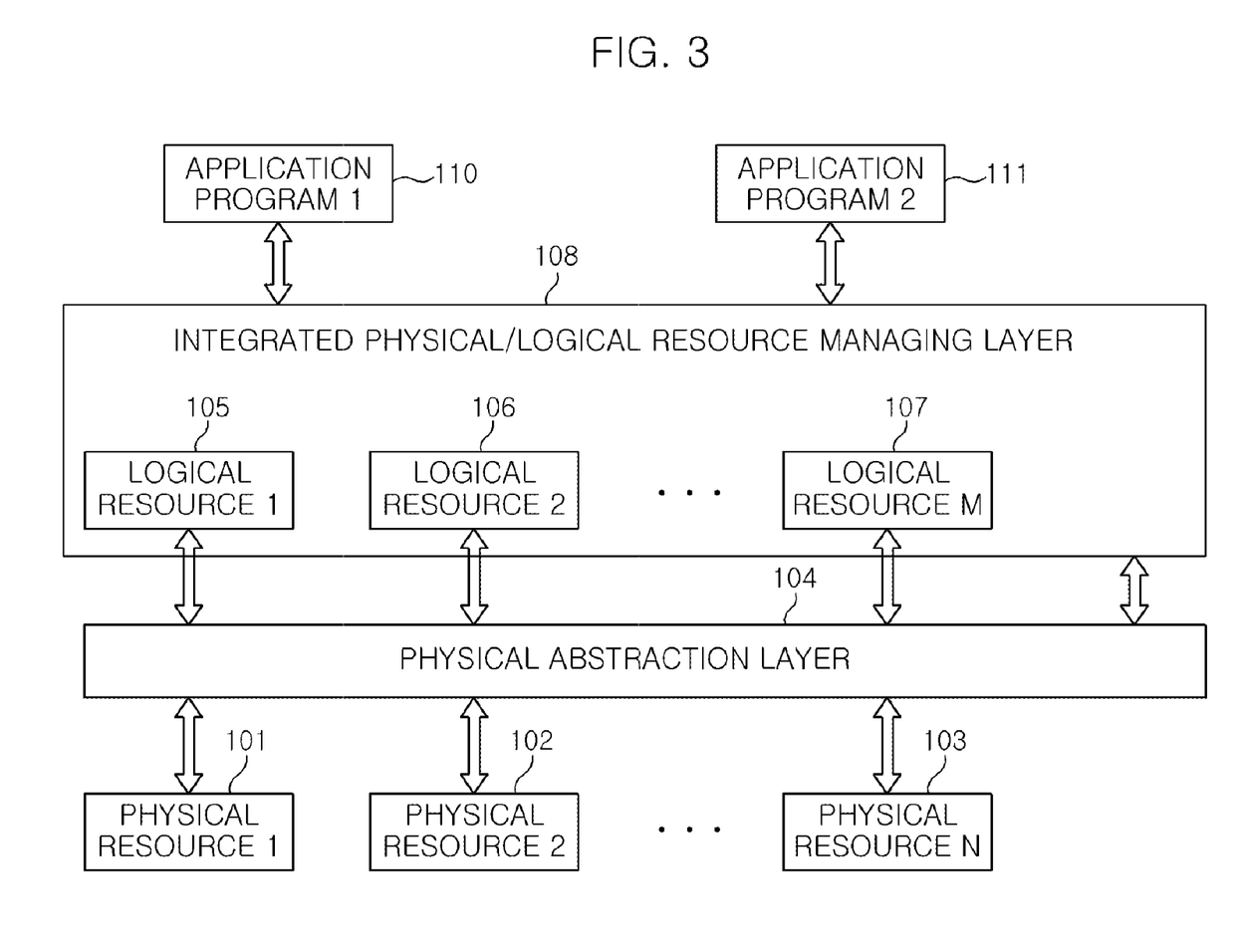
FIG. 3 is a diagram for describing an integrated resource management structure according to an embodiment of the present invention.

FIG. 3 is a diagram for describing a resource management method according to an embodiment of the present invention.

Referring to this figure, in the case of the resource management method according to the embodiment of the present invention, the physical resources 101 to 103, as one of application services that operate in the above-mentioned devices 40 and 70, the networks 20 and 60, the user 30, and the server 10 or the gateway 50, provides an interoperation function for overcoming heterogeneous operation environments of the resources by using a layer 104 for abstracting physical environments of the resources.

Logical resources 105 to 107 that operate above the physical abstraction layer 104, as resource instances expressed in a predetermined format to correspond to the physical resources 101 to 103, are grouped and managed in accordance with the types of the resources.

An integrated physical/logical resource management layer 108 generates a physical/logical relation map between the resources by utilizing data collected from the physical abstraction layer 104 and data collected from the logical resources 105 to 107 and provides the integrated resource management function on the basis of the physical/logical relation map. Further, the integrated physical/logical resource management layer 108 includes a function to process a request for resource information and the relation information between the resources received from application programs 110 to 111 and notify the processing result.

Figure 4:
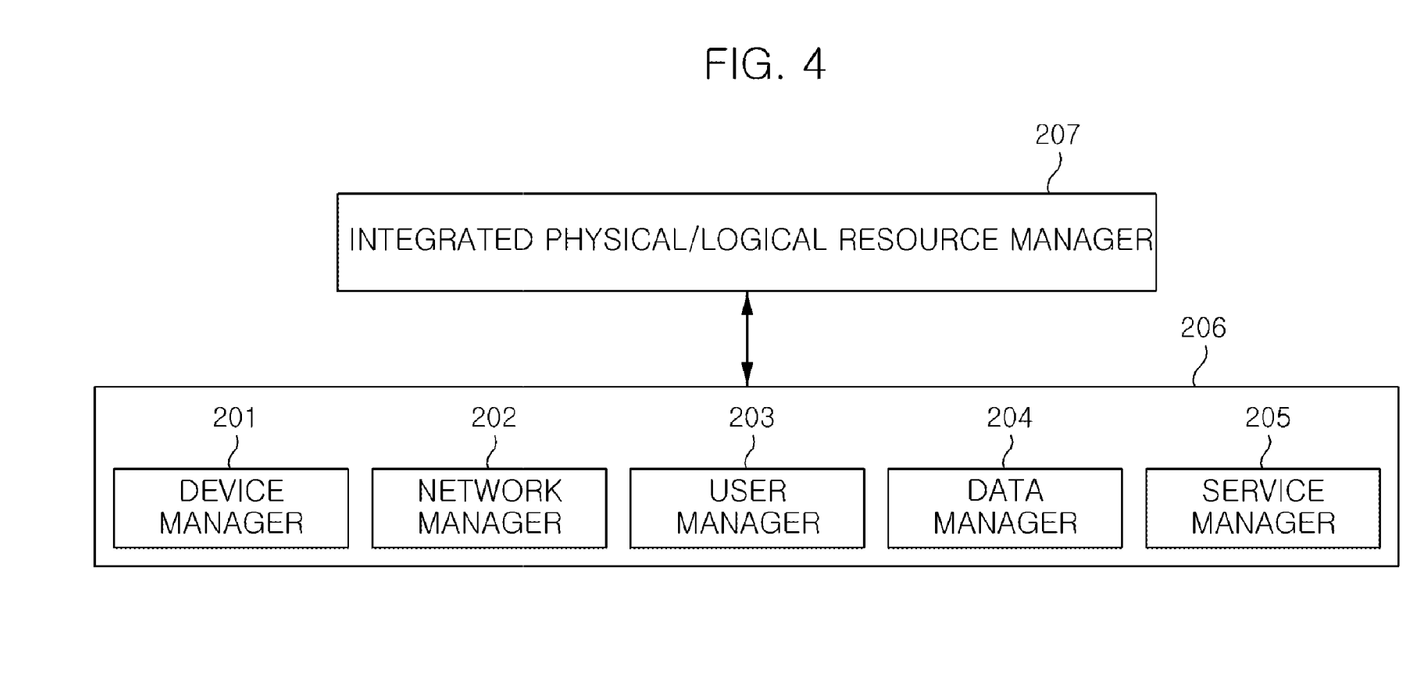
FIG. 4 is a diagram for describing components of an integrated resource management layer according to an embodiment of the present invention.

FIG. 4 is a diagram for describing components of an integrated resource management layer according to an embodiment of the present invention.

Referring to this figure, in the case of the components of the integrated resource management layer according to the embodiment of the present invention, the logical resources 105 to 107 corresponding to the physical resources 101 to 103 may be grouped into a device manager 201, a network manager 202, a user manager 203, a data manager 204, and a service manager 205 in accordance with the types of the resources. This is an example for managing the logical resources and a manager for managing the logical resources may be added or omitted.

The device manager 201, as a function block serving to manage logical devices corresponding to physical devices, may include a device event processing function, a device control processing function, a device position recognizing and managing function, and a device information storing function.

The network manager 202 as a function block serving to manage link states of physical networks and collect network topology data may include a traffic monitoring function, a traffic analyzing function, a network topology data collecting function, etc.

The user manager 203, as a function block serving to identify the user and provide management for each user, may include a user recognizing function such as a user identification/behavior/priority, etc., a user authenticating function, an access control function, etc.

The data manager 204, as a function block managing contents data, may include sensor data collecting, analyzing, and processing functions, a contents data quality control function, a contents information management function, etc.

The service manager 205 as a function block managing function-unit services may include a session management function, service registering and cancelling functions, a function of sensing a collision between a plurality of services, etc.

The integrated physical/logical resource manager 207 senses the relation between the resources by analyzing event data generated from the logical resource managers 206 and data collected from the physical abstraction layer 104, generates a relation map between the resources through the sensed relation, and allocates and processes the resources in accordance with a request from an upper-layer user.

Figure 5:
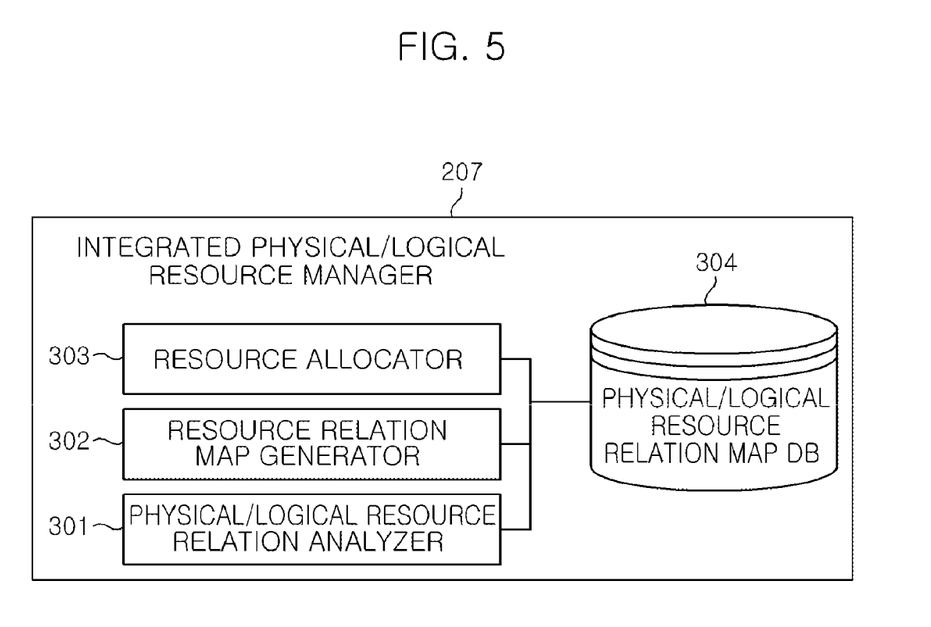
FIG. 5 is a diagram for describing components of an integrated physical/logical resource manager according to an embodiment of the present invention.

FIG. 5 is a diagram for describing components of an integrated physical/logical resource manager according to an embodiment of the present invention.

Referring to this figure, in the case of the components of the integrated resource manager according to the embodiment of the present invention, the physical/logical resource relation analyzer 301 maintains consistency of the physical/logical relationship between the resources by analyzing state and relation information of the resources generated from the logical resource manager 206 and events collected from the physical abstraction layer. Various algorithms such as a graph retrieval method may be adopted in order to the consistency of the state and relation information of individually collected resources. Further, the physical/logical resource relation analyzer 301 may include a function to automatically sense additional relation information by event analysis.

Figure 6:
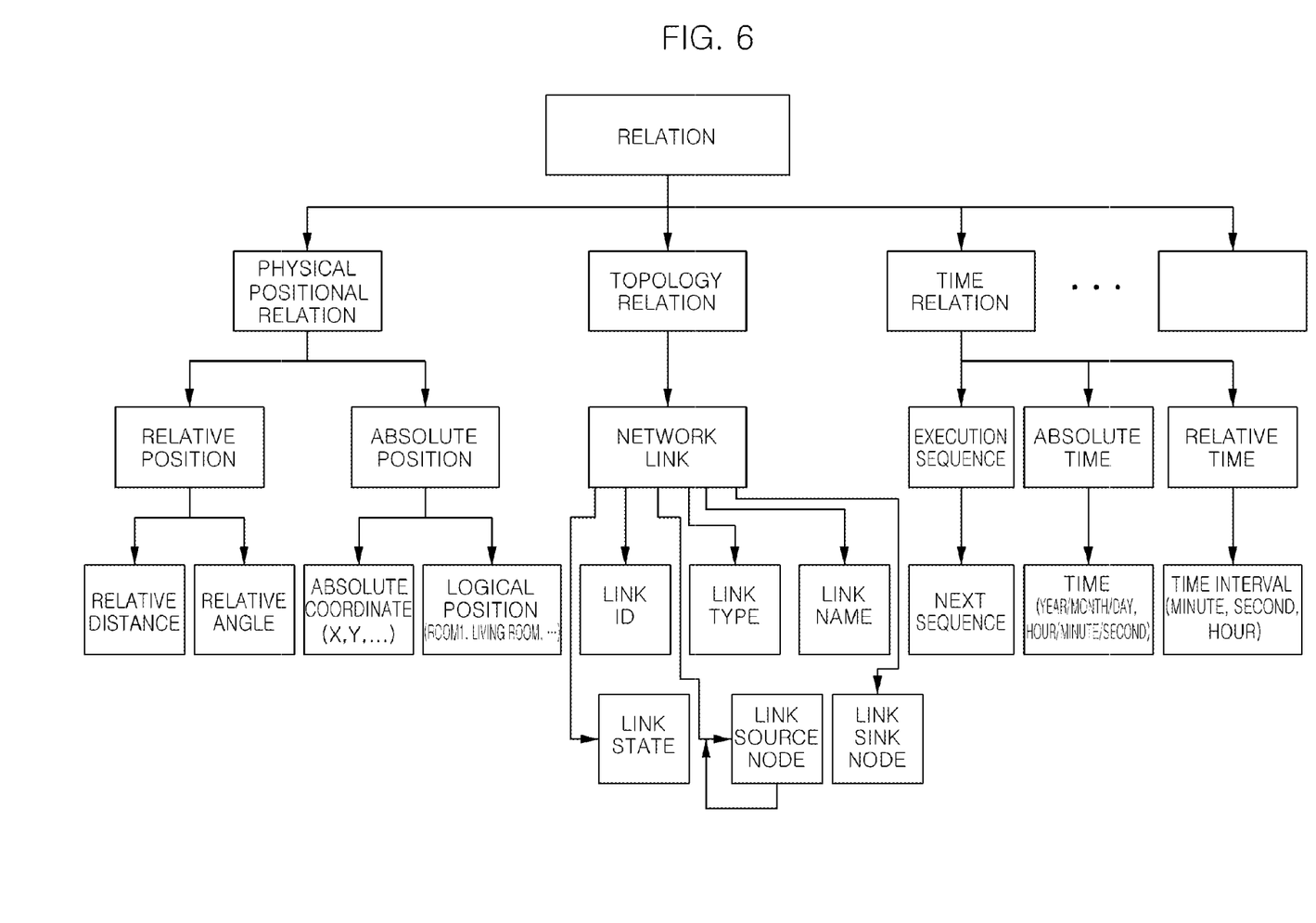
FIG. 6 is a diagram for describing an example of a relation type between resources according to an embodiment of the present invention.

Known dependency analysis techniques such as an event correlation analysis technique, etc., may be used in order to sense the relation between the resources. In general, the event correlation analysis technique is performed by four steps of event filtering, event collection, event masking, and dependency analysis by a dependency graph. A result of analyzing the relation between the resources is transferred as an input value of the resource relation map generator 302, are generated in a map, a graph, or various other forms which can express the relation between the resources on the basis of the input value and are stored in a physical/logical resource relation map storage 304. A logical resource allocator 303 includes a function to allocate and process the resources in accordance with a resource allocation request. FIG. 6 is a diagram for describing an example of a relation type between resources according to an embodiment of the present invention.

Referring to this figure, in the case of the example of the relation type between the resources according to the embodiment of the present invention, relation types automatically sensed by the physical/logical resource relation analyzer 301 includes at least one of a positional relation, a topology relation, a time relation, etc. The physical positional relation in expressing the relation between the resources may be expressed by a relative positional relation including a relative distance and a relative angle or an absolute positional relation including absolute coordinates such as (X, Y, . . . ) or logical positions such as Room 1 and a living room.

On the contrary, the topology relation may be expressed by a network link including one of an ID, a link type, a link name, a link state, and link source node and sink node information of the network link. Further, the time relation may be expressed by an absolute time such as an execution sequence or year/month/day or a relative time by time intervals such as a minute, a second, etc. like the next sequence.

As an example of use of the time relation by the execution sequence, when an error occurs on the execution sequence of the resources, the time relation may be used to trace back the error.

Figure 7:
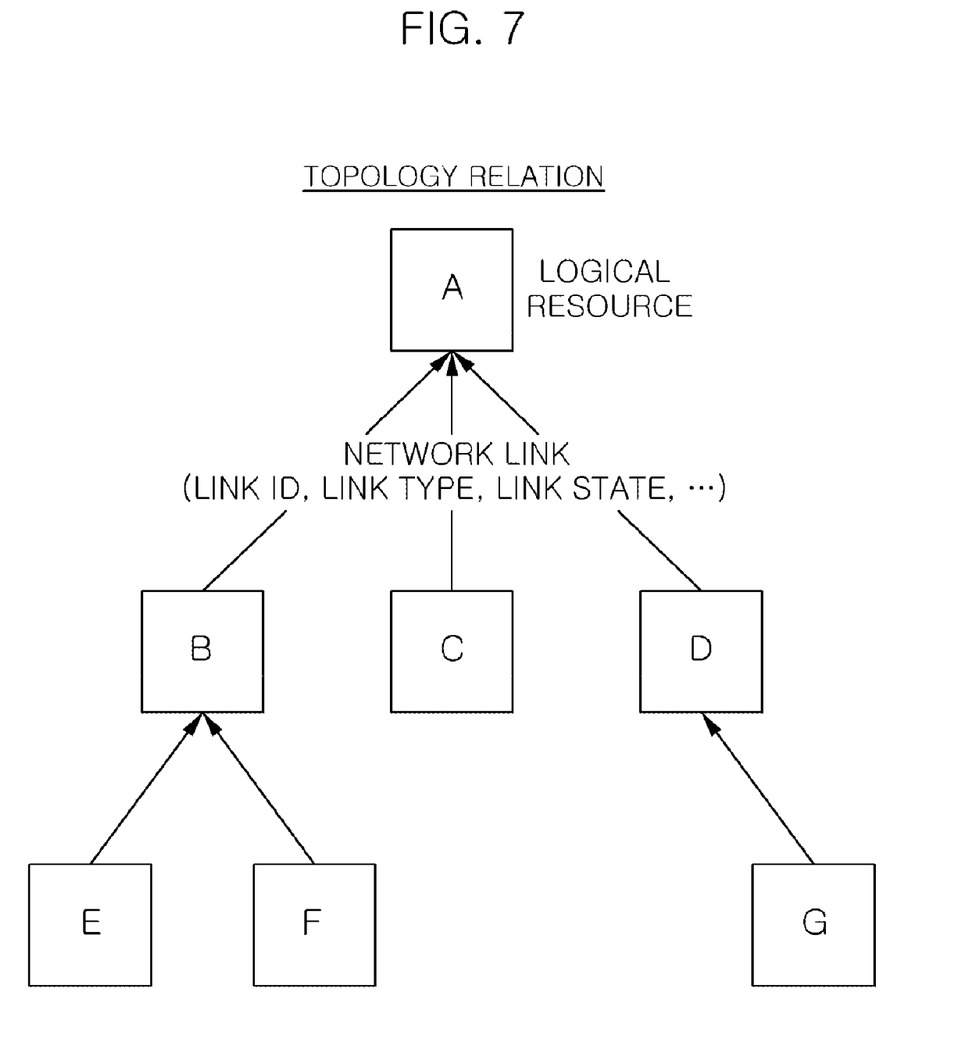
FIG. 7 is a diagram for describing an example of a topology relation between resources according to an embodiment of the present invention.

FIG. 7 is a diagram for describing an example of a topology relation between resources depending on a relation type of FIG. 6 according to an embodiment of the present invention.

Referring to this figure, a topology relation between resources A to G which are the logical resources may be expressed by the network link constituted by the link ID, the link type, and the link state.

Figure 8:
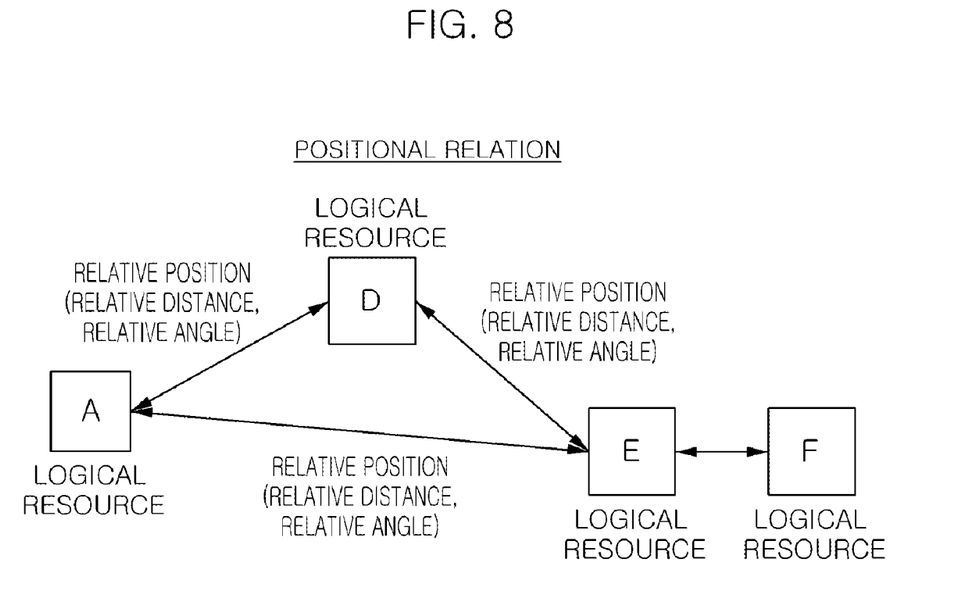
FIG. 8 is a diagram for describing an example of a positional relation between resources according to an embodiment of the present invention.

FIG. 8 is a diagram for describing an example of a positional relation between resources depending on a relation type of FIG. 6 according to an embodiment of the present invention.

Referring to this figure, a positional relation between resources A, D, E, and F which are the logical resources may be expressed by the relative position constituted by the relative distance and the relative angle.

Figure 9:
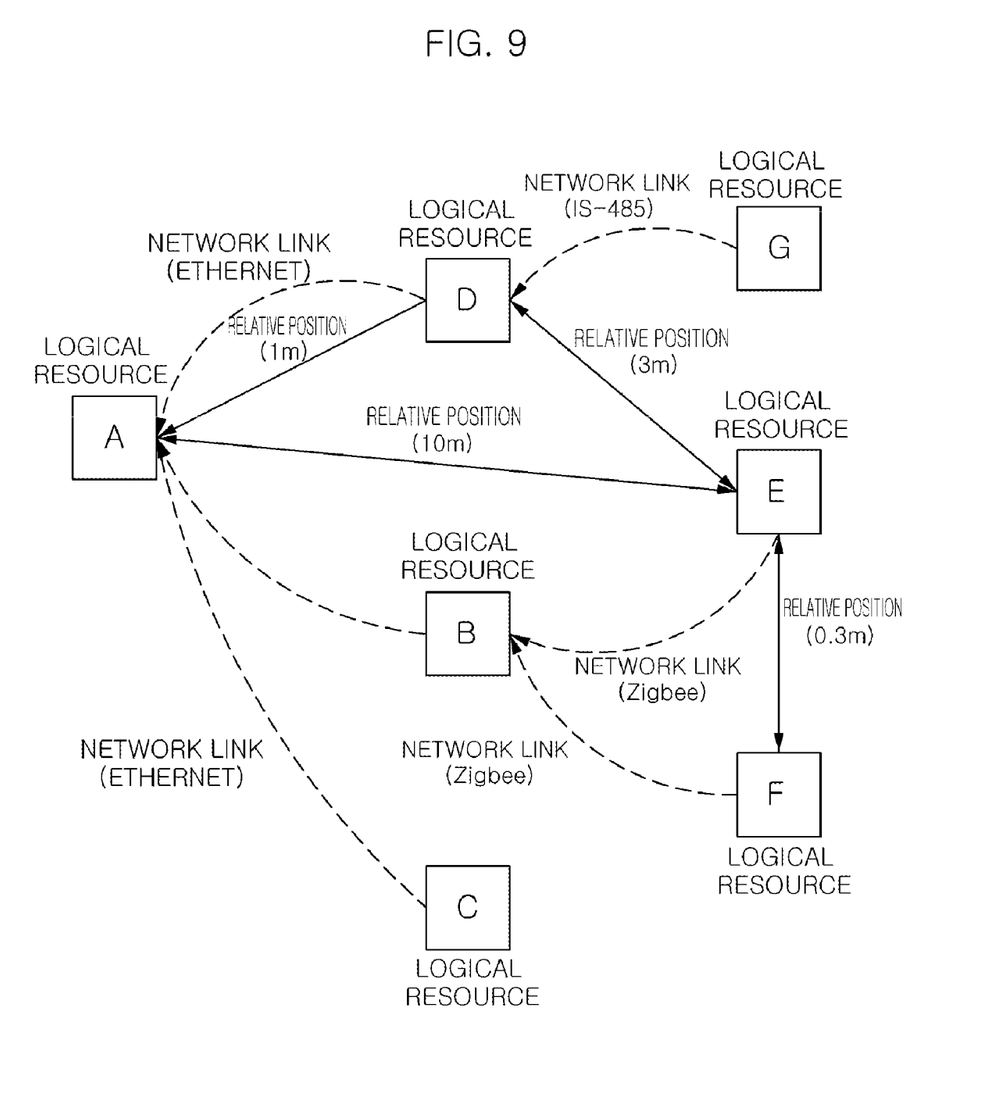
FIG. 9 is a diagram for describing an instance example for an example of the relation between resources of FIGS. 7 and 8 according to an embodiment of the present invention.

FIG. 9 is a diagram for describing an instance example for an example of the relation between resources of FIGS. 7 and 8 according to an embodiment of the present invention.

Referring to this figure, assuming that the example of the topology relation between the logical resources A to G of FIG. 7 and the example of the positional relation between the logical resources A, D, E, and F of FIG. 8 are drawn by the physical/logical resource relation analyzer 301, the instance of the resource relation map which may be generated by the resource relation map generator 302 is illustrated.

Figure 10:
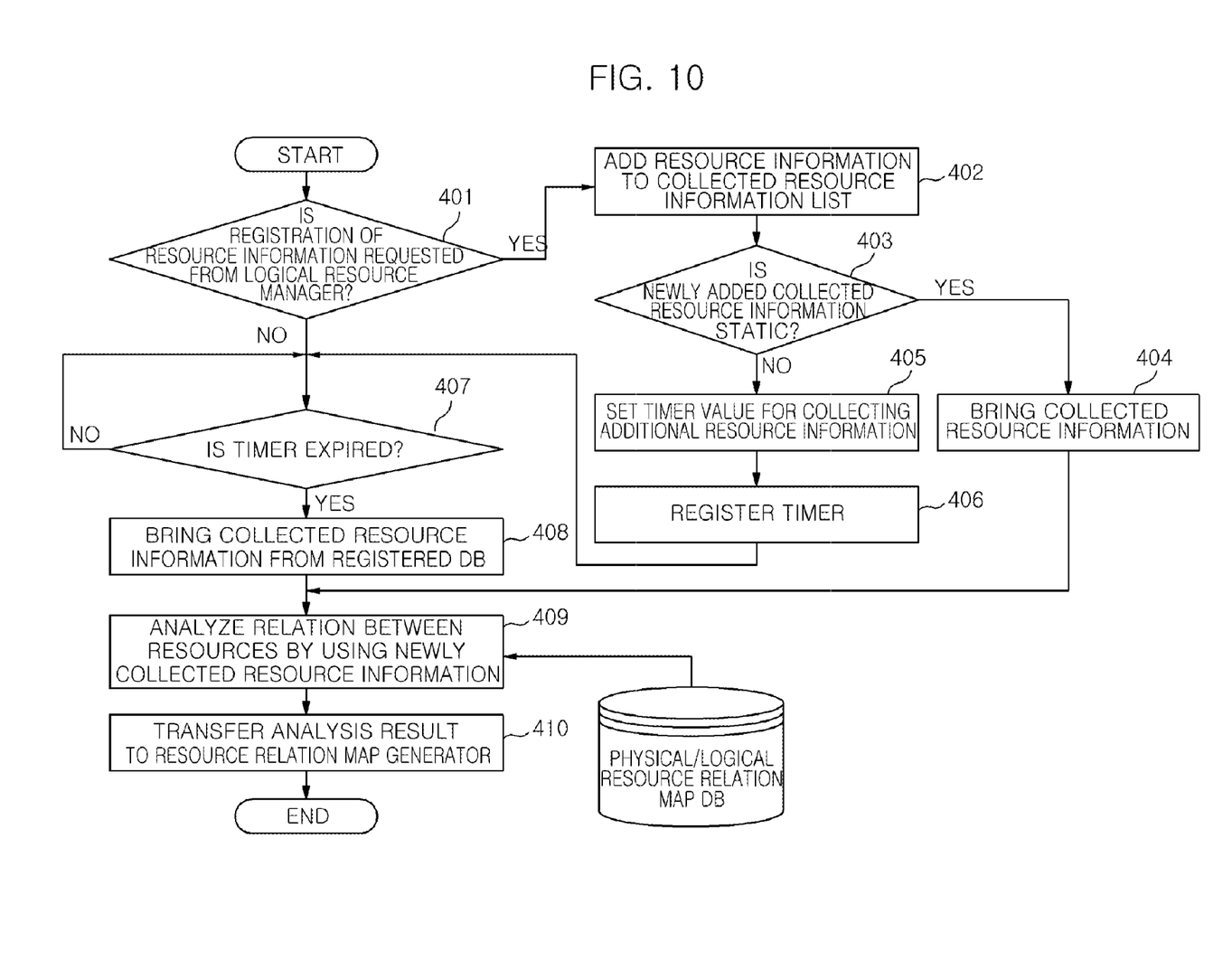
FIG. 10 is a diagram for describing an embodiment of an operational flow of a physical/logical resource relation analyzer according to an embodiment of the present invention.
Figure 11:
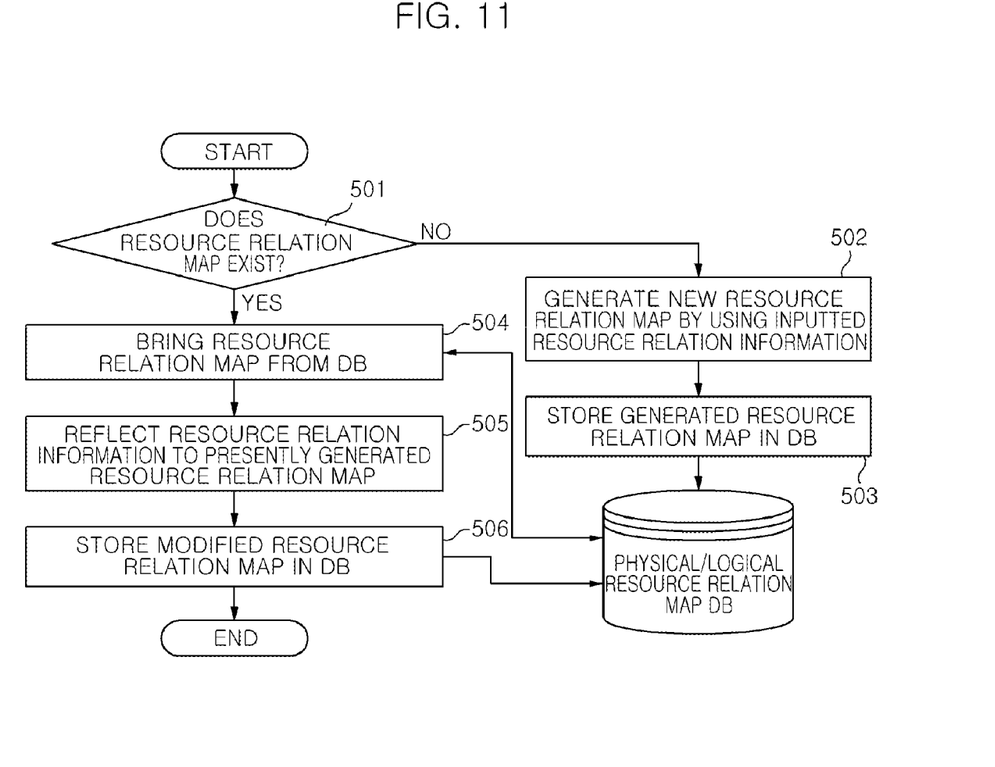
FIG. 11 is a diagram for describing an embodiment of an operational flow of a physical/logical resource map generator according to an embodiment of the present invention.

FIGS. 10 and 11 are flowcharts showing an operational flow of an integrated physical/logical resource manager 207 according to an embodiment of the present invention. FIG. 10 is a diagram for describing an embodiment of an operational flow of a physical/logical resource relation analyzer according to an embodiment of the present invention.

Referring to FIG. 10, the physical/logical resource relation analyzer 301 performs a process including processing a request for registering resource information providable from a logical resource manager (S401 to S406), periodically collecting the registered collected resource information (S407 and S408), analyzing the relation between resource information by using newly collected resource information and information stored in a physical/logical resource relation map 412 (S409), and transferring the analysis result as an input value of a resource relation map generator 302 (S410).

At the registration request processing (S401 to S406), when the request for registering the resource information providable by the logical resource manager 205 itself is received from the logical resource manager 205 (S401), the corresponding resource information is first added to a collected resource list (S402) and a type of the newly added collected resource information is checked (S403). If the type of the collected resource information is a static type in which the information is not periodically changed, the collected resource information is directly brought from a designated storage (S404) and the resource relation is analyzed by using the brought information (S409). If the type of the collected resource information is a dynamic type in which the information is periodically or aperiodically changed (S403), the resource information should be periodically collected, thus, a timer value for that is set (S405) and a timer is registered (S406). When the registered timers are expired (S407), the collected resource information is brought from a registered storage (S408) and the relation between the collected resource information is analyzed by using the acquired information and the information stored in the physical/logical resource relation map (S409). The analyzed resource relation information is transferred to the resource relation map generator 302 (S410).

FIG. 11 is a diagram for describing an embodiment of an operational flow of a physical/logical resource map generator 302 according to an embodiment of the present invention.

Referring to FIG. 11, the physical/logical resource relation map generator 302 checks whether or not a resource relation map exists in a physical/logical resource relation map storage 304 (S501), generates a new resource relation map by using a newly inputted resource relation information when the resource relation map does not exist (S502), and stores the generated map in the storage (S503). When the resource relation map has already existed in the storage 304, the resource relation map is brought from the storage 304 (S504) and new resource relation information is reflected on the current resource relation map (S505). The newly modified resource relation map is again stored in the storage 304 (S506).

As described above, according to an embodiment of the present invention, it is possible to provide management convenience to a user and consistently and exquisitely manage resources by integrally managing resources through dynamically analyzing and mapping the relation between the resources.

Some steps of the present invention can be implemented as a computer-readable code in a computer-readable recording medium. The computer-readable recording media includes all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, a magneto-optical storage device, etc., and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the preferred embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A method for physical/logical relationship mapping between resources, comprising:
   abstracting heterogeneous environments of physical resources, wherein a component corresponding to one management unit is defined as a physical resource;
   expressing each physical resource of the physical resources as a resource instance in a predetermined format to generate logical resources;
   grouping the logical resources in accordance with types of the logical resources, and managing the logical resources that are grouped; and
   analyzing a relationship between the physical and logical resources based on event data generated in managing the logical resources and data collected by abstracting the heterogeneous environments of the physical resources, thereby generating a physical/logical resource relation map and wherein the analyzing the physical/logical relationship includes:
      processing a request for registering resource information from a logical resource manager;
      periodically collecting the registered resource information;
      analyzing relationship between the resource information by using newly collected resource information and information stored in the physical/logical resource relation map; and
   transferring the analyzed relationship between the resource information as an input value to generate the relation map, wherein the processing the request for registering resource information includes:
   adding a resource corresponding to the resource information for which the registration is requested to a collected resource list when the request for registering the resource information is received from the logical resource manager;
   checking a type of the resource information based on the step of the adding;
   if the type of the resource information is a static type in which the information is not periodically changed, directly bringing the resource information from a designated storage; and
   if the type of the resource information is a dynamic type in which the information is periodically or periodically changed, setting a timer value for periodically collecting the resource information and registering a timer.

2. The method for physical/logical relationship mapping between resources according to claim 1, wherein the relationship between the physical and logical resources is automatically sensed by analyzing information and events of the logical resources generated in a physical/logical resource managing layer where the logical resources are managed and data collected from a physical abstraction layer where the abstracting is performed.

3. The method for physical/logical relationship mapping between resources according to claim 1, wherein the relation map is generated in an expressible map or graph based on a result of analyzing the relationship between the resources.

4. The method for physical/logical relationship mapping between resources according to claim 1, wherein the analyzing the physical/logical relationship further comprises performing a function to allocate and process the resources in accordance with a resource allocation request.

5. The method for physical/logical relationship mapping between resources according to claim 1, wherein the physical/logical relationship includes at least one of a physical positional relation, a topology relation, and a time relation.

6. The method for physical/logical relationship mapping between resources according to claim 5, wherein the physical positional relation includes at least one of a relative positional relation including a relative distance and a relative angle and an absolute positional relation including an absolute coordinate or a logical position.

7. The method for physical/logical relationship mapping between resources according to claim 5, wherein the topology relation includes at least one of an ID, a link type, a link name, a link source node and sink node information, and a link state of a network link.

8. The method for physical/logical relationship mapping between resources according to claim 5, wherein the time relation includes at least one of an execution sequence, an absolute time, and a relative time by a time interval.

9. The method for physical/logical relationship mapping between resources according to claim 8, wherein the relative time by the time interval is used to trace back an error when the error occurs in the execution sequence.

10. The method for physical/logical relationship mapping between resources according to claim 1, wherein the relation map is generated by:
    checking whether or not the relation map exists in a physical/logical resource relation map storage;
    generating a new relation map by using a newly inputted resource relation information and storing the new relation map in the storage if the relation map does not exist in the storage;
    bringing the relation map from the storage and reflecting new resource relation information on the relation map if the relation map exists in the storage; and
    storing the relation map on which the new resource relation information is reflected in the storage.

11. A computer system having a non-transitory computer readable medium for physical/logical relationship mapping between resources and, the non-transitory computer readable medium comprising:
    code for abstracting heterogeneous environments of physical resources, wherein a component corresponding to one management unit is defined as a physical resource;
    code for expressing each physical resource of the physical resources as a resource instance in a predetermined format to generate logical resources;
    code for grouping the logical resources in accordance with types of the logical resources, and managing the logical resources that are grouped; and
    code for analyzing a relationship between the physical and logical resources based on event data generated in managing the logical resources and data collected by abstracting the heterogeneous environments of the physical resources, thereby generating a physical/logical resource relation map and wherein the analyzing the physical/logical relationship includes:
       processing a request for registering resource information from a logical resource manager;
       periodically collecting the registered resource information;

analyzing relationship between the resource information by using newly collected resource information and information stored in the physical/logical resource relation map; and transferring the analyzed relationship between the resource information as an input value to generate the physical/logical resource relation map, wherein the processing the request for registering resource information includes:

adding a resource corresponding to the resource information for which the registration is requested to a collected resource list when the request for registering the resource information is received from the logical resource manager;

checking a type of the resource information based on the step of the adding;

if the type of the resource information is a static type in which the information is not periodically changed, directly bringing the resource information from a designated storage; and if the type of the resource information is a dynamic type in which the information is periodically or periodically changed, setting a timer value for periodically collecting the resource information and registering a timer.

12. The computer system according to claim 11, wherein the code for analyzing includes:

a physical/logical resource relation analyzer maintaining consistency of the relationship between the physical and logical resources by analyzing states and relation information of the logical resources generated from a logical resource manager where the logical resources are managed and events collected from a physical abstraction layer where the abstracting is performed;

a resource relation map generator generating the relation map based on a result of analyzing the relationship between the physical and logical resources;

a resource relation map storage storing the relation map; and a resource allocator allocating and processing the physical and logical resources in accordance with a resource allocation request.

13. The computer system according to claim 11, wherein the physical/logical relationship includes at least one of a physical positional relation, a topology relation, and a time relation.

14. The computer system according to claim 13, wherein the physical positional relation includes at least one of a relative positional relation including a relative distance and a relative angle and an absolute positional relation including an absolute coordinate or a logical position.

15. The computer system according to claim 13, wherein the topology relation includes at least one of an ID, a link type, a link name, link source node and sink node information, and a link state of a network link.

16. The computer system according to claim 13, wherein the time relation includes at least one of an execution sequence, an absolute time, and a relative time by a time interval.

* * * * *